United States Patent
Asumi

(10) Patent No.: US 9,025,185 B2
(45) Date of Patent: May 5, 2015

(54) INFORMATION PROCESSING APPARATUS FOR PROCESSING A MANAGEMENT SETTING, INFORMATION PROCESSING METHOD, AND COMPUTER READABLE MEDIUM

(71) Applicant: Fuji Xerox Co., Ltd., Tokyo (JP)

(72) Inventor: Taishi Asumi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/944,233

(22) Filed: Jul. 17, 2013

(65) Prior Publication Data

US 2014/0285839 A1 Sep. 25, 2014

(30) Foreign Application Priority Data

Mar. 21, 2013 (JP) ................................. 2013-057713

(51) Int. Cl.
G06F 3/12 (2006.01)
H04N 1/32 (2006.01)
H04N 1/00 (2006.01)

(52) U.S. Cl.
CPC ............. *H04N 1/32* (2013.01); *H04N 1/00278* (2013.01)

(58) Field of Classification Search
CPC .... H04L 67/14; H04L 63/0272; H04L 63/029
USPC ............ 358/1.15, 1.14; 709/223, 203; 726/11
See application file for complete search history.

(56) References Cited

U.S. PATENT DOCUMENTS

| 6,785,727 | B1* | 8/2004 | Yamazaki | 709/229 |
|---|---|---|---|---|
| 2002/0055977 | A1 | 5/2002 | Nishi | |
| 2003/0172308 | A1* | 9/2003 | Imai | 713/201 |
| 2004/0139188 | A1* | 7/2004 | Imai | 709/223 |
| 2011/0194146 | A1* | 8/2011 | Sato | 358/1.15 |
| 2013/0246566 | A1* | 9/2013 | Asumi | 709/217 |

FOREIGN PATENT DOCUMENTS

| JP | A-2002-223483 | 8/2002 |
|---|---|---|
| JP | A-2003-330823 | 11/2003 |
| JP | A-2009-54171 | 3/2009 |
| JP | A-2011-76626 | 4/2011 |

* cited by examiner

*Primary Examiner* — Jacky X Zheng
(74) *Attorney, Agent, or Firm* — Oliff PLC

(57) ABSTRACT

An information processing apparatus includes a first receiving unit, a registering unit, a requiring unit, a second receiving unit, and a transmitting unit. The first receiving unit receives a reservation and setting process executable time information, the reservation being a reservation for transmission of a management setting, the setting process executable time representing a period of time during which the second information processing apparatus may process the management setting. The registering unit registers the reservation and the information regarding the period of time. The requiring unit requires, in a case where a time at which a communication from a second information processing apparatus was received corresponds to the information regarding the period of time, a first information processing apparatus to transmit the management setting. The second receiving unit receives the management setting. The transmitting unit transmits to the second information processing apparatus the management setting.

12 Claims, 12 Drawing Sheets

| TRANSMISSION SOURCE | TRANSMISSION DESTINATION | MANAGEMENT SETTING PROCESSING EXECUTABLE PERIOD OF TIME | STANDBY TIME | EXECUTION STATUS |
|---|---|---|---|---|
| 174.25.X.214 | 174.2.X.3 | 15:00 TO 17:00 | 0 MINUTE | END |
| 174.25.X.152 | 174.3.X.0 | 10 MINUTES AFTER ISSUANCE OF FIRST PROCESS | 5 MINUTES | ACTIVE |

INFORMATION PROCESSING APPARATUS FOR PROCESSING A MANAGEMENT SETTING, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2013-057713 filed Mar. 21, 2013.

BACKGROUND

Technical Field

The present invention relates to an information processing apparatus, an information processing method, and a computer readable medium.

SUMMARY

According to an aspect of the invention, there is provided an information processing apparatus including a first receiving unit, a registering unit, a requiring unit, a second receiving unit, and a transmitting unit. The first receiving unit receives from a first information processing apparatus a reservation and setting process executable time information, the reservation being a reservation for transmission of a management setting to be processed by a second information processing apparatus, the setting process executable time representing a period of time during which the second information processing apparatus may process the management setting. The registering unit registers in a storing unit the reservation and the information regarding the period of time received by the first receiving unit. The requiring unit requires, in a case where a time at which a communication from the second information processing apparatus was received corresponds to the information regarding the period of time registered in the storing unit, the first information processing apparatus to transmit the management setting to be processed by the second information processing apparatus corresponding to the period of time. The second receiving unit receives from the first information processing apparatus, in response to a request by the requiring unit, the management setting to be processed by the second information processing apparatus. The a transmitting unit transmits to the second information processing apparatus the management setting received by the second receiving unit.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be explained below with reference to the drawings.

Figure 1:
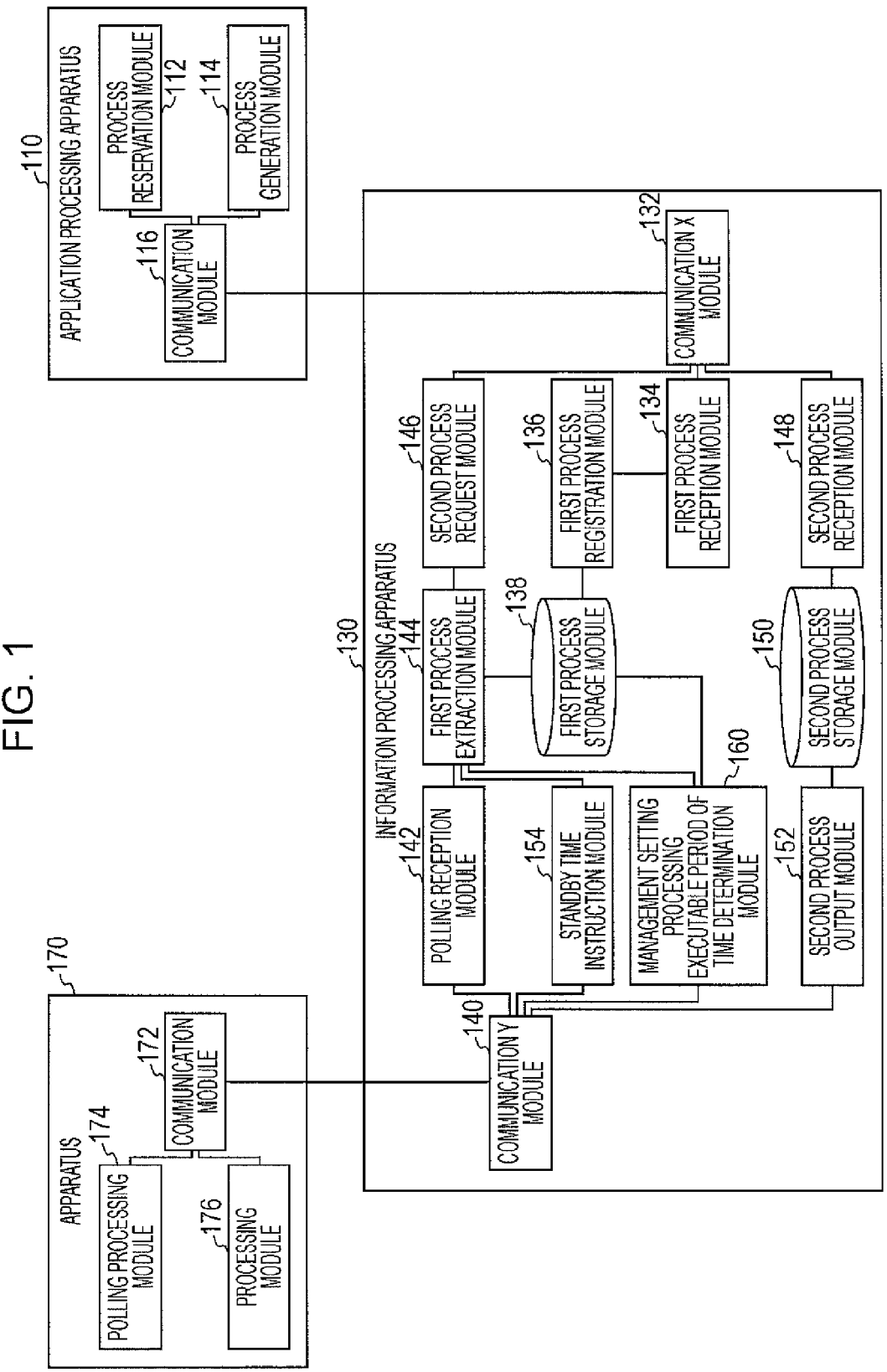
FIG. 1 is a schematic diagram illustrating an example of the module configuration according to an exemplary embodiment of the invention.

FIG. 1 is a schematic diagram illustrating an example of the module configuration according to an exemplary embodiment.

The term "module" generally represents a component such as software (a computer program), hardware, or the like, which may be logically separated. Thus, modules in exemplary embodiments represent modules in a hardware configuration as well as modules in a computer program. Therefore, the exemplary embodiments also provide explanations of computer programs for causing the components to function as modules (including a program causing a computer to execute various procedures, a program causing a computer to function as various units, and a program causing a computer to implement various functions), systems, and methods. For the sake of a clear explanation, the terms "store" and "cause something to store" and other equivalent expressions are used. In a case where an exemplary embodiment concerns a computer program, these terms and expressions mean "causing a storing device to store" or "controlling a storing device to store". In addition, a module may correspond to a function in a one-to-one relationship. However, for implementation, a single module may be implemented by a single program, plural modules may be implemented by a single program, or a single module may be implemented by plural programs. Furthermore, plural modules may be executed by a single computer or a single module may be executed by plural computers in a distributed or parallel environment. One module may include another module. Hereinafter, the term "connection" represents logical connection (exchange of data, instruction, cross-reference between data, and the like) as well as physical connection. The term "predetermined" represents set before a target process is performed. Being "predetermined" represents not only being set before processing in an exemplary embodiment starts but also being set even after the processing in the exemplary embodiment starts, in accordance with the condition and state at that time or in accordance with the condition and state of a period until that time, as long as before the target process is performed. In the case where plural "predetermined values" exist, they may be different from one another. Alternatively, two or more values (obviously, including all the values) may be the same. Furthermore, the description having the meaning of "If A occurs, B is performed" represents that "A determination as to whether or not A occurs is performed, and when it is determined that A occurs, B is performed". However, the case where the determination as to whether or not A occurs is not required is excluded.

A "system" or an "apparatus" may be implemented by a single computer, hardware, apparatus, or the like as well as by plural computers, hardware, apparatuses, or the like connected using a communication unit such as a network (including communication connection in a one-to-one correspondence). The term "apparatus" is used as a synonym for the term "system". Obviously, the term "system" does not include merely a social "mechanism" (social system), which is an artificial arrangement.

For each process in a module or for individual processes in a module performing plural processes, target information is read from a storing device and the result of the process is written to the storing device after the process is performed. Thus, the explanation of reading from the storing device before the process is performed or the explanation of writing to the storing device after the process is performed may be omitted. The storing device may be a hard disk, a random-access memory (RAM), an external storage medium, a storing device using a communication line, a register inside a central processing unit (CPU), or the like.

As illustrated in FIG. 1, an information processing apparatus 130 according to an exemplary embodiment of the invention includes a communication X module 132, a first process reception module 134, a first process registration module 136, a first process storage module 138, a communication Y module 140, a polling reception module 142, a first process extraction module 144, a second process request module 146, a second process reception module 148, a second process storage module 150, a second process output module 152, a standby time instruction module 154, and a management setting process executable period of time determination module 160. The information processing apparatus 130 is connected to an application processing apparatus 110 and an apparatus 170 via a communication line.

The information processing apparatus 130 receives from the application processing apparatus 110 a process to be performed by the apparatus 170 and transmits the process to the apparatus 170.

The apparatus 170 is an apparatus that performs information processing including image processing and the like and corresponds to, for example, an image processing apparatus (more specifically, a copying machine, a facsimile machine, a scanner, a printer, a multi-functioned machine (for example, an image processing apparatus having two or more functions of a scanner, a printer, a copying machine, a facsimile machine, and the like)), a personal computer (PC), or the like. Plural apparatuses 170 may be connected to the information processing apparatus 130.

A process to be performed by the apparatus 170 includes, for example, a process for setting a power-saving mode, a process for setting a destination table for a facsimile machine, a process for setting a private box, a management setting process for updating firmware or the like, and the like. In general, a process to be performed by the apparatus 170 is called a job. Thus, more specifically, transmission of "a process to be performed by a second information processing apparatus" corresponds to the below:

(1) for setting of a private box or a destination table, a program for a management setting process and set details (destination information etc.) are transmitted to the apparatus 170; and (2) for updating of firmware, an updated program is transmitted to the apparatus 170.

The application processing apparatus 110 generates a process to be performed by the apparatus 170. The application processing apparatus 110 generates, for example, a process for setting a power-saving mode, a process for setting a destination table for a facsimile machine, and the like. More specifically, a process to be performed by the apparatus 170 corresponds to a program for executing such a process, set data, and the like. Plural application processing apparatuses 110 may be connected to the information processing apparatus 130.

The application processing apparatus 110 includes a process reservation module 112, a process generation module 114, and a communication module 116.

The process reservation module 112 is connected to the communication module 116. The process reservation module 112 transmits via the communication module 116 to the information processing apparatus 130 a reservation (reservation process) for transmission of a process to be performed by the apparatus 170 and a period of time within which the apparatus 170 is to perform the process. The transmission of a reservation also corresponds to a generation reservation for generating a process to be performed by the apparatus 170. More specifically, a notification that the information processing apparatus 130 is ready for transmission of a process is received. Upon receiving the notification, the process generation module 114 generates the process.

A period of time represents the period of time within which the apparatus 170 may perform a management setting process (hereinafter, also referred to as a management setting process executable period of time). A period of time may be defined, for example, by a start time (may be a year, a month, a date, an hour, a minute, a second, a unit smaller than a second, or a combination of some of the units mentioned above) and a finish time, a start time and a period of time, a period of time up to a predetermined period of time after a specified time (for example, x minutes), or only a start time. The period of time is provided, for example, for controlling such that a process including many setting contents, for which a certain amount of processing time is to be taken, is performed in a period of time (for example, a lunch break) during which the use load of the apparatus 170 is low. Furthermore, the period of time is provided for controlling such that in the case where a different process is not capable of being performed while the apparatus 170 is performing a process, the process is performed within the period of time desired by a user.

As the preparation for the transmission of a process by the information processing apparatus 130, for example, the information processing apparatus 130 receives a communication from the apparatus 170. More specifically, since there is a firewall between the information processing apparatus 130 and the apparatus 170, the information processing apparatus 130 is not capable of sending a communication to the apparatus 170 (for example, transmission of a process generated by the application processing apparatus 110) at a desired timing. Only in the case where the apparatus 170 sends a communication to the information processing apparatus 130, the information processing apparatus 130 is capable of sending a communication to the apparatus 170 as a response to the communication from the apparatus 170.

Furthermore, in the case where a process is generated in advance and stored in the information processing apparatus 130 and a communication is sent from the apparatus 170 to the information processing apparatus 130, the process stored in the information processing apparatus 130 is capable of being transmitted to the apparatus 170.

However, it is not desirable that a process including, for example, private information or the like is kept stored in the information processing apparatus 130. Furthermore, since a process generated by the application processing apparatus 110 and a process acquisition request from the apparatus 170 are not in synchronization with each other, it may take a long time from generation of the process to its arrival to the apparatus 170. In the meantime, the process stored in the information processing apparatus 130 may become obsolete (does not reflect the latest information).

Thus, when the information processing apparatus 130 receives a communication from the apparatus 170, the application processing apparatus 110 is informed of the reception of the communication. With the reception of the communication as a trigger, the process reservation module 112 makes a reservation for generation of a process.

The process reservation module 112 may transmit via the communication module 116 to the information processing apparatus 130 the time to be taken to generate the process (a standby time during which the apparatus 170 is to wait).

Furthermore, the process reservation module 112 may transmit via the communication module 116 to the information processing apparatus 130 an instruction as to whether or not an instruction by the standby time instruction module 154 of the information processing apparatus 130 is to be issued.

The process generation module 114 is connected to the communication module 116. The process generation module 114 generates a process to be performed by the apparatus 170. The process generation module 114 generates the process at a timing when the process generation module 114 receives via the communication module 116 from the information processing apparatus 130 a request to generate "a process to be performed by the apparatus 170". The process generation module 114 transmits via the communication module 116 the generated "process to be performed by the apparatus 170".

The communication module 116 is connected to the process reservation module 112, the process generation module 114, and the communication X module 132 of the information processing apparatus 130. The communication module 116 performs communication with the information processing apparatus 130. The communication module 116 performs, for example, transmission of a reservation process to the information processing apparatus 130, reception of a generation request from the information processing apparatus 130, and transmission of "a process to be performed by the apparatus 170" to the information processing apparatus 130.

The communication X module 132 is connected to the first process reception module 134, the second process request module 146, the second process reception module 148, and the communication module 116 of the application processing apparatus 110. The communication X module 132 communicates with the application processing apparatus 110. The communication X module 132 transmits to the first process reception module 134 or the second process reception module 148 the contents received from the application processing apparatus 110, and transmits to the application processing apparatus 110 a request transmitted from the second process request module 146.

The first process reception module 134 is connected to the communication X module 132 and the first process registration module 136. The first process reception module 134 receives via the communication x module 132 from the application processing apparatus 110 a reservation process, which is a reservation for transmission of a process to be performed by the apparatus 170, and the period of time within which the apparatus 170 is to perform the process.

The first process reception module 134 may receive via the communication X module 132 from the application processing apparatus 110 the standby time during which the apparatus 170 is to wait. The standby time may be included in the reservation process.

The first process reception module 134 may receive via the communication X module 132 from the application processing apparatus 110 an instruction as to whether or not to an instruction by the standby time instruction module 154 is to be issued. The instruction as to whether or not an instruction by the standby time instruction module 154 is to be issued may be included in the reservation process.

The first process registration module 136 is connected to the first process reception module 134 and the first process storage module 138. The first process registration module 136 registers into the first process storage module 138 the reservation process and the period of time received by the first process reception module 134.

The first process storage module 138 is connected to the first process registration module 136, the first process extraction module 144, and the management setting process executable period of time determination module 160. The first process storage module 138 is accessed by the first process registration module 136 and the first process extraction module 144, and stores therein the reservation process and the period of time received by the first process reception module 134.

The communication Y module 140 is connected to the polling reception module 142, the second process output module 152, the standby time instruction module 154, the management setting process executable period of time determination module 160, and a communication module 172 of the apparatus 170. The communication Y module 140 communicates with the apparatus 170, transmits to the polling reception module 142 the contents received from the apparatus 170, and transmits to the apparatus 170 the "process to be performed by the apparatus 170" output from the second process output module 152 and the instruction transmitted from the standby time instruction module 154. The communication Y module 140 also transmits to the management setting process executable period of time determination module 160 the time at which the communication from the apparatus 170 was received.

The polling reception module 142 is connected to the communication Y module 140 and the first process extraction module 144. The polling reception module 142 receives via the communication Y module 140 a communication from the apparatus 170. The communication includes, for example, a polling communication. As polling communication, communication is generated at predetermined time intervals. For example, communication is generated every day, every twelve hours, or the like. Furthermore, the contents of communication include a process acquisition request, a report of the state of the apparatus 170, and the like. Any type of communication other than a polling communication may also be performed as long as the communication is sent from the apparatus 170. For example, a communication of the emergency report of an accident may be sent from the apparatus 170.

The first process extraction module 144 is connected to the first process storage module 138, the polling reception module 142, the second process request module 146, the standby time instruction module 154, and the management setting process executable period of time determination module 160.

In the case where the result of a determination by the management setting process executable period of time determination module 160 is "the reception time is within the period of time stored in the first process storage module 138", the first process extraction module 144 extracts a reservation process from the first process storage module 138.

The second process request module 146 is connected to the communication X module 132 and the first process extraction module 144. In the case where a communication from the apparatus 170 has been received, the time at which the communication from the apparatus 170 was received is within the period of time, and a reservation process is stored in the first process storage module 138, the second process request module 146 requires, via the communication x module 132, the application processing apparatus 110 to transmit a "process to be performed by the apparatus 170". The state in which "a communication from the apparatus 170 has been received" represents the state in which the polling reception module 142 has received a polling communication via the communication Y module 140. The state in which "a reservation process is stored in the first process storage module 138" represents the state in which the first process extraction module 144 has extracted a reservation process from the first process storage module 138.

In the case where the time at which a communication from the apparatus 170 was received is a predetermined period of time before the period of time stored in the first process storage module 138, after the period of time has been reached, the second process request module 146 may require the application processing apparatus 110 to transmit a process corresponding to the period of time.

The second process reception module 148 is connected to the communication X module 132 and the second process storage module 150. In response to a request from the second process request module 146, the second process reception module 148 receives via the communication X module 132 from the application processing apparatus 110 "a process to be performed by the apparatus 170". For example, the second process reception module 148 may cause the second process storage module 150 to store therein the "process to be performed by the apparatus 170" received from the application processing apparatus 110 or may directly transmit the "process to be performed by the apparatus 170" to the second process output module 152.

The second process storage module 150 is connected to the second process reception module 148 and the second process output module 152. The second process storage module 150 is accessed by the second process reception module 148 and the second process output module 152 and stores therein the "process to be performed by the apparatus 170".

The second process output module 152 is connected to the communication Y module 140 and the second process storage module 150. The second process output module 152 transmits via the communication Y module 140 to the apparatus 170 the process received by the second process reception module 148. For example, the second process output module 152 may transmit the "process to be performed by the apparatus 170" received by the second process reception module 148 or may transmit the "process to be performed by the apparatus 170" stored in the second process storage module 150.

In the case where a communication from the apparatus 170 is received after a standby time has passed, the second process output module 152 may transmit to the apparatus 170 the process received by the second process reception module 148.

In the case where a process to be transmitted to the apparatus 170 exists when a communication from the apparatus 170 is received, the second process output module 152 may transmit the process to the apparatus 170. In the case where a process to be transmitted has not been received when a communication from the apparatus 170 is received, the second process output module 152 may transmit to the apparatus 170 information indicating that the apparatus 170 is to enter a standby state. The "information indicating that the apparatus 170 is to enter standby state" is, for example, information for issuing an instruction to send a communication again after X minutes have passed.

In the case where the standby time received by the first process reception module 134 is shorter than or equal to a predetermined period of time, the second process output module 152 may wait until the second process reception module 148 has received a process without causing the standby time instruction module 154 to issue an instruction and may transmit to the apparatus 170 the process received by the second process reception module 148.

In the case where the instruction received by the first process reception module 134 indicates that the standby time instruction module 154 is not caused to issue an instruction, the second process output module 152 may wait until the second process reception module 148 has received a process without causing the standby time instruction module 154 to issue an instruction and may transmit to the apparatus 170 the process received by the second process reception module 148.

The standby time instruction module 154 is connected to the communication Y module 140 and the first process extraction module 144. In the case where a reservation process is stored in the first process storage module 138 when a communication from the apparatus 170 is received, the standby time instruction module 154 instructs the apparatus 170 to send a communication to the information processing apparatus 130 after the standby time received by the first process reception module 134 has passed. The instruction is transmitted via the communication Y module 140 to the apparatus 170. The "communication from the apparatus 170" represents a communication (for example, a polling communication) transmitted via the communication Y module 140 from the apparatus 170. The state in which "a reservation process is stored in the first process storage module 138" represents the state in which a reservation process has been extracted from the first process storage module 138 by the first process extraction module 144.

The management setting process executable period of time determination module 160 is connected to the first process storage module 138, the communication Y module 140, and the first process extraction module 144. The management setting process executable period of time determination module 160 receives the time when a communication from the apparatus 170 was received by the communication Y module 140, and compares the reception time with the period of time stored in the first process storage module 138. That is, the management setting process executable period of time determination module 160 determines whether or not the reception time is within the period of time stored in the first process storage module 138. The management setting process executable period of time determination module 160 transmits the result of the determination to the first process extraction module 144.

The apparatus 170 includes the communication module 172, a polling processing module 174, and a processing module 176.

The communication module 172 is connected to the polling processing module 174, the processing module 176, and the communication Y module 140 of the information processing apparatus 130. The communication module 172 communicates with the information processing apparatus 130, sends to the apparatus 170 a polling communication that is to be performed by the polling processing module 174, and transmits to the processing module 176 a process received from the apparatus 170.

The polling processing module 174 is connected to the communication module 172. The polling processing module 174 sends a polling communication or the like via the communication module 172 to the information processing apparatus 130.

The processing module 176 is connected to the communication module 172. The processing module 176 receives via the communication module 172 from the information processing apparatus 130 "a process to be performed by the apparatus 170".

Figure 2:
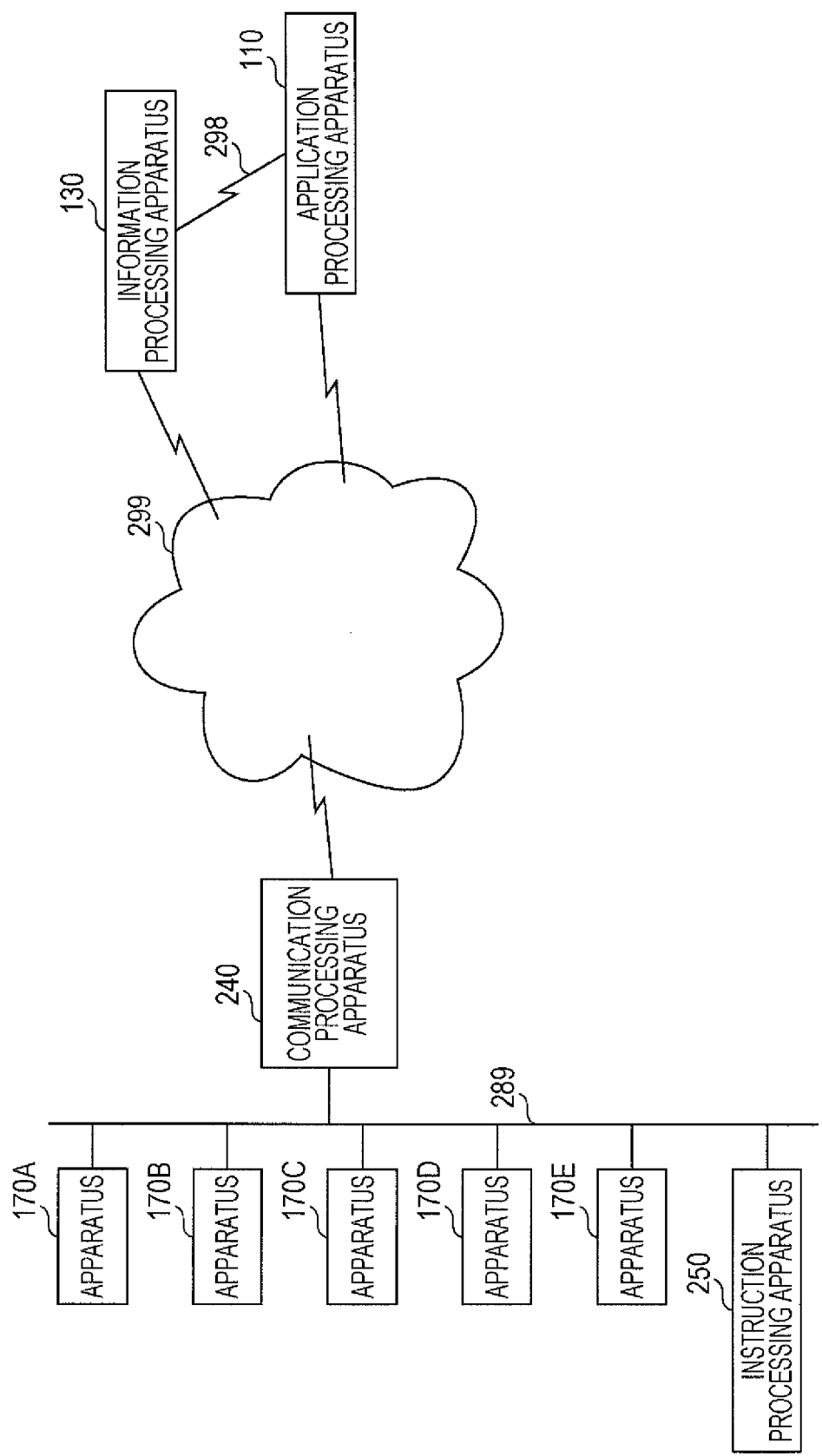
FIG. 2 is an explanatory diagram illustrating an example of the system configuration implementing an exemplary embodiment of the invention.

FIG. 2 is an explanatory diagram illustrating an example of the system configuration implementing an exemplary embodiment of the invention.

The application processing apparatus 110 is connected via a communication line 298 to the information processing apparatus 130 and is connected via a communication line 299 to a communication processing apparatus (firewall) 240. The information processing apparatus 130 is connected via the communication line 298 to the application processing apparatus 110 and is connected via the communication line 299 to the communication processing apparatus (firewall) 240. The communication processing apparatus (firewall) 240 is connected via the communication line 299 to the information processing apparatus 130 and the application processing apparatus 110 and is connected via an in-company communication line 289 to an apparatus 170A, an apparatus 170B, an apparatus 170C, an apparatus 170D, an apparatus 170 E, and an instruction processing apparatus 250. The apparatuses 170A to 170E, the instruction processing apparatus 250, and the communication processing apparatus (firewall) 240 are connected to one another via the in-company communication line 289.

The information processing apparatus 130 performs management of the apparatuses 170A to 170E. For example, the information processing apparatus 130 is arranged inside a center that performs management of the apparatus 170 or the like and is a server that performs message (processing) transfer processing between the apparatus 170 and the application processing apparatus 110. The information processing apparatus 130 performs management of a process received from the application processing apparatus 110 in a queue. When an acquisition request is received from the apparatus 170, the information processing apparatus 130 transmits a process in a queue to the apparatus 170. When a processing result of the process is reported from the apparatus 170, the information processing apparatus 130 may transmit the processing result to the application processing apparatus 110.

The application processing apparatus 110 performs management of processes to be performed by the apparatuses 170A to 170E. For example, the application processing apparatus 110 is arranged in a center that performs management of the apparatus 170 or the like and is a server that performs business processing. The application processing apparatus 110 generates a process (for example, various settings) to be performed by the apparatus 170 and transmits the generated process to the information processing apparatus 130. The application processing apparatus 110 may receive the processing result of the process from the information processing apparatus 130. Furthermore, the application processing apparatus 110 may receive an instruction regarding a period of time from the instruction processing apparatus 250.

For example, the apparatus 170 is an apparatus (an information processing apparatus, such as an image processing apparatus) arranged in a client's site and regularly (for example, once a day) transmits a process acquisition request to the information processing apparatus 130. The apparatus 170 performs a received process and reports the processing result of the process to the information processing apparatus 130. Furthermore, since the apparatus 170 is arranged inside a client's site, the in-company communication line 289, the apparatus 170, and so on are protected by a firewall function of the communication processing apparatus (firewall) 240. More specifically, although a communication is capable of being sent from the apparatus 170 to the information processing apparatus 130, a desired communication is not capable of being sent from the information processing apparatus 130 to the apparatus 170. A communication from the information processing apparatus 130 to the apparatus 170 is performed only as a response to a communication from the apparatus 170.

The instruction processing apparatus 250 transmits an instruction regarding a period of time to the application processing apparatus 110 and instructs the apparatus 170 or the like to send a polling communication to the information processing apparatus 130.

Processes of this system are summarized as described below.

Two-stage processes are generated.

First Stage (Reservation Process)

The application processing apparatus 110 generates a process only representing that preparation for generation of a process is completed, and registers the generated process into the information processing apparatus 130 (hereinafter, also referred to as a first process). In the first process, an instruction regarding a management setting process executable period of time may be issued.

After the apparatus 170 sends a communication to the information processing apparatus 130, the information processing apparatus 130 compares the reception time with a management setting process executable period of time. In the case where the reception time is within the management setting process executable period of time, the information processing apparatus 130 instructs the apparatus 170 to send a communication again after a predetermined period of time has passed, notifies the application processing apparatus 110 of the instruction, and performs a process at the second stage. In the case where the reception time is not within the management setting process executable period of time, the information processing apparatus 130 instructs the apparatus 170 to send a communication again after a predetermined period of time has passed and notifies the application processing apparatus 110, which has generated the first process, of the instruction.

Second Stage (Transmission of the Entity of a Process)

Once receiving the above-mentioned notification, the application processing apparatus 110 generates the proper process (process to be performed by the apparatus 170), and registers the generated process into the information processing apparatus 130 (hereinafter, also referred to as a second process). When a communication is received again after the predetermined period of time has passed, the information processing apparatus 130 transmits the second process to the apparatus 170. In the case where the second process is registered into the information processing apparatus 130, the second process is transmitted to the apparatus 170. In the case where the second process is not registered, the information processing apparatus 130 instructs the apparatus 170 to send a communication again after a predetermined period of time has passed.

Figure 3:
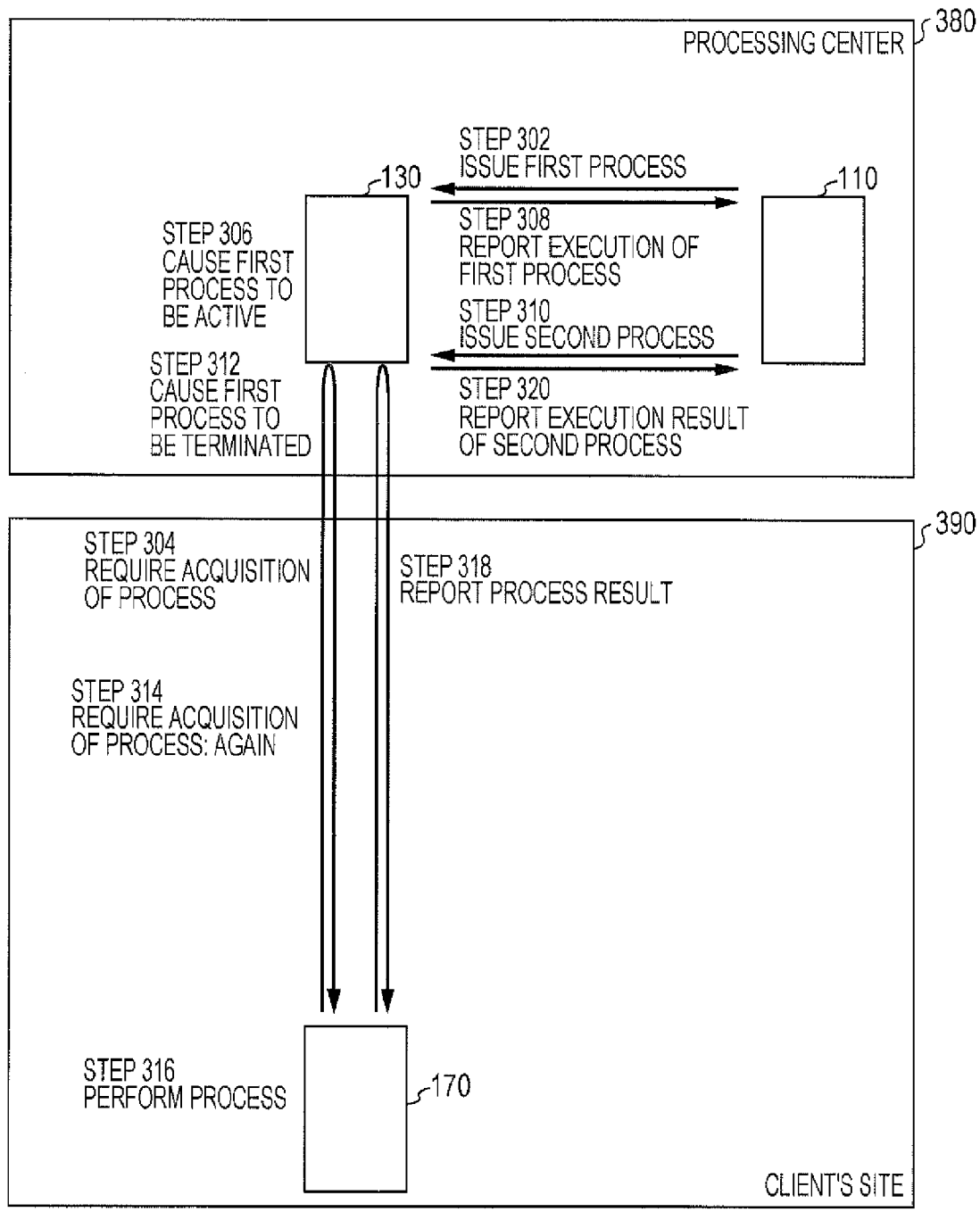
FIG. 3 is an explanatory diagram illustrating a processing example in an exemplary embodiment of the invention.

FIG. 3 is an explanatory diagram illustrating a processing example in an exemplary embodiment of the invention. The application processing apparatus 110 and the information processing apparatus 130 are arranged in a processing center 380, and the apparatus 170 is arranged in a client's site 390.

In step 302, the application processing apparatus 110 issues a first process to the information processing apparatus 130. The first process may include polling interval information as information on the standby time during which the apparatus 170 is to wait. The polling interval information is used as the value of NextHint (standby time variable) designated when the information processing apparatus 130 responds to the apparatus 170 in step 304. Furthermore, the first process does not include a process to be performed by the apparatus 170. The term of validity of the first process (the period during which the first process is stored in the information processing apparatus 130) may be defined. The first process may include an instruction regarding a management setting process executable period of time. In the case where the first process does not include an instruction regarding a management setting process executable period of time, the apparatus 170 may perform a process in a desired period of time. In the case where the first process includes an instruction regarding a management setting process executable period of time, the apparatus 170 defines in advance the "set polling time" as a time within the management setting process executable period of time. The term of validity of the first process is set to be unlimited (the first process is not deleted until the apparatus 170 has acquired a process).

Setting of the "set polling time" represents setting of the time at which the apparatus 170 sends a communication to the information processing apparatus 130. The application processing apparatus 110 designates the "set polling time" so as to be within the management setting process executable period of time, and instructs the information processing apparatus 130 to set the "set polling time" for the apparatus 170. When receiving a polling communication from the apparatus 170, the information processing apparatus 130 instructs the apparatus 170 to set the "set polling time". The apparatus 170 stores therein a "set polling time". When receiving the instruction to set a "set polling time", the apparatus 170 changes the stored "set polling time" into the received "set polling time".

Figures 4, 5:
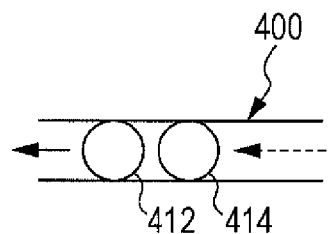
FIG. 4 is an explanatory diagram illustrating an example of a processing queue in a processing example in an exemplary embodiment of the invention.
FIG. 5 is an explanatory diagram illustrating an example of the data structure of a processing table.

The contents of the first process may be, for example, a processing table 500. FIG. 5 is an explanatory diagram illustrating an example of the data structure of the processing table 500. The processing table 500 contains a transmission source field 510, a transmission destination field 520, a management setting process executable period of time field 530, a standby time field 540, and an execution status field 550. In the transmission source field 510, information on the application processing apparatus 110 that has transmitted a first process is stored. For example, the IP address, identification information, or the like of the application processing apparatus 110 is stored in the transmission source field 510. In the transmission destination field 520, information on the apparatus 170 that is to perform a second process is stored. For example, the IP address, identification information, or the like of the apparatus 170 is stored in the transmission destination field 520. In the management setting process executable period of time field 530, a management setting process executable period of time is stored. The value of NextHint (a standby time variable) is stored in the standby time field 540. In the execution status field 550, for example, "end", "active", or the like is stored as the current status of a target process.

In step 304, when the "set polling time" is reached, the apparatus 170 transmits, through a polling communication or the like, to the information processing apparatus 130 a process acquisition request.

In step 306, the information processing apparatus 130 determines whether or not the time when the communication from the apparatus 170 was received is within the management setting process executable period of time. In the case where it is determined that the reception time is within the management setting process executable period of time, the status of the first process is defined as being active. As described above, the "set polling time" is designated so as to be within the management setting process executable period of time, and it is set in advance such that a communication is sent from the apparatus 170 to the information processing apparatus 130 at the "set polling time". The first process is a special job (a job to be performed by the information processing apparatus 130) and is not transmitted to the apparatus 170. The first process enters an "end" state at the time when the information processing apparatus 130 receives the second process issued by the application processing apparatus 110. As a response to the apparatus 170 by the information processing apparatus 130 (step 304), polling interval information is transmitted to the apparatus 170 as the value of NextHint. The apparatus 170 is in a standby state during NextHint (polling interval information), and transmits a job acquisition request again.

In step 308, the information processing apparatus 130 notifies the application processing apparatus 110 of information indicating that the first process is active.

In step 310, the application processing apparatus 110 issues a second process to the information processing apparatus 130.

Upon receiving from the information processing apparatus 130 the notification indicating that the first process enters the active state, the application processing apparatus 110 generates the second process and issues the generated second process. The second process includes information to be processed by the apparatus 170. For example, the second process may include private information for a destination table setting process or the like. Furthermore, in the second process, the term of validity of the second process (the period of time during which the second process is stored in the information processing apparatus 130) may be defined. For example, on the assumption that the second process is immediately consumed (transferred to the apparatus 170), the term of validity of the second process may be set shorter than the term of validity of the first process. For example, the term of validity of the second process may be set to about several minutes.

Since the information processing apparatus 130 receives the second process issued by the application processing apparatus 110, the information processing apparatus 130 causes the first process to be terminated in step 312.

In step 314, the apparatus 170 sends a process acquisition request again to the information processing apparatus 130. In response to the process acquisition request, the information processing apparatus 130 transmits the second process to the apparatus 170.

In step 316, the apparatus 170 performs the process (second process).

In step 318, the apparatus 170 notifies the information processing apparatus 130 of the processing result.

In step 320, the information processing apparatus 130 notifies the result of the execution of the second process to the application processing apparatus 110.

FIG. 4 is an explanatory diagram illustrating an example of a processing queue in a processing example in an exemplary embodiment of the invention. The state in which a process 412 and a process 414 are accumulated in a processing queue is illustrated in FIG. 4. Since processes are performed in order in the processing example illustrated in FIG. 3, the state in which the process 412 and the process 414 are accumulated in the processing queue 400 and the process 412 and the process 414 are processed in order is illustrated in FIG. 4.

In the processing example illustrated in FIG. 3, the processes may be performed as described below (variation of FIG. 3). That is, in the example described below, in the case where it does not take time to generate a process by the application processing apparatus 110, the apparatus 170 immediately enters the standby state without setting a standby time for the apparatus 170.

In step 302, the process reservation module 112 issues an instruction not to cause the standby time instruction module 154 to issue an instruction (for not causing the apparatus 170 to be in the standby state). Alternatively, the standby time (NextHint) is set to a sufficiently small value (a value for which the information processing apparatus 130 determines that the standby time instruction module 154 is not caused to issue an instruction).

Even if the apparatus 170 transmits, through a polling communication or the like, a process acquisition request to the information processing apparatus 130 in step 304, the information processing apparatus 130 causes the apparatus 170 to wait until the processing of step 312 has finished (until the information processing apparatus 130 has received the second process from the application processing apparatus 110) without immediately responding to the process acquisition request. That is, the apparatus 170 enters the standby state without receiving a response to the process acquisition request in step 304 (in the example described above, NextHint is received, and after the apparatus 170 waits for the time corresponding to NextHint, a process acquisition request is issued again in step 314).

Then, in step 314, as a response to step 304, the information processing apparatus 130 transmits to the apparatus 170 the second process received from the application processing apparatus 110.

The apparatus 170 may transmit an acquisition request to the information processing apparatus 130 again during the execution of the first process. In this case, the information processing apparatus 130 may cause the apparatus 170 to wait again. The information processing apparatus 130 may designate NextHint and send information indicating that no second process exists. At this time, NextHint may be designated so as to be shorter than the original NextHint (NextHint designated in step 304 in the explanation with reference to FIG. 3) by subtracting an elapsed time from the original NextHint.

Furthermore, in the case where the time to be taken to generate a second process is found to be different from the initial presumption (for example, it is turned out that it takes a longer time) during the generation of the second process, the application processing apparatus 110 may notify the information processing apparatus 130 of a new estimated time remaining. After the information processing apparatus 130 receives the notification, in the case where a process acquisition request is received again from the apparatus 170 in step 314 before the second process is generated, the information processing apparatus 130 may designate the new estimated time remaining as NextHint.

Figure 6:
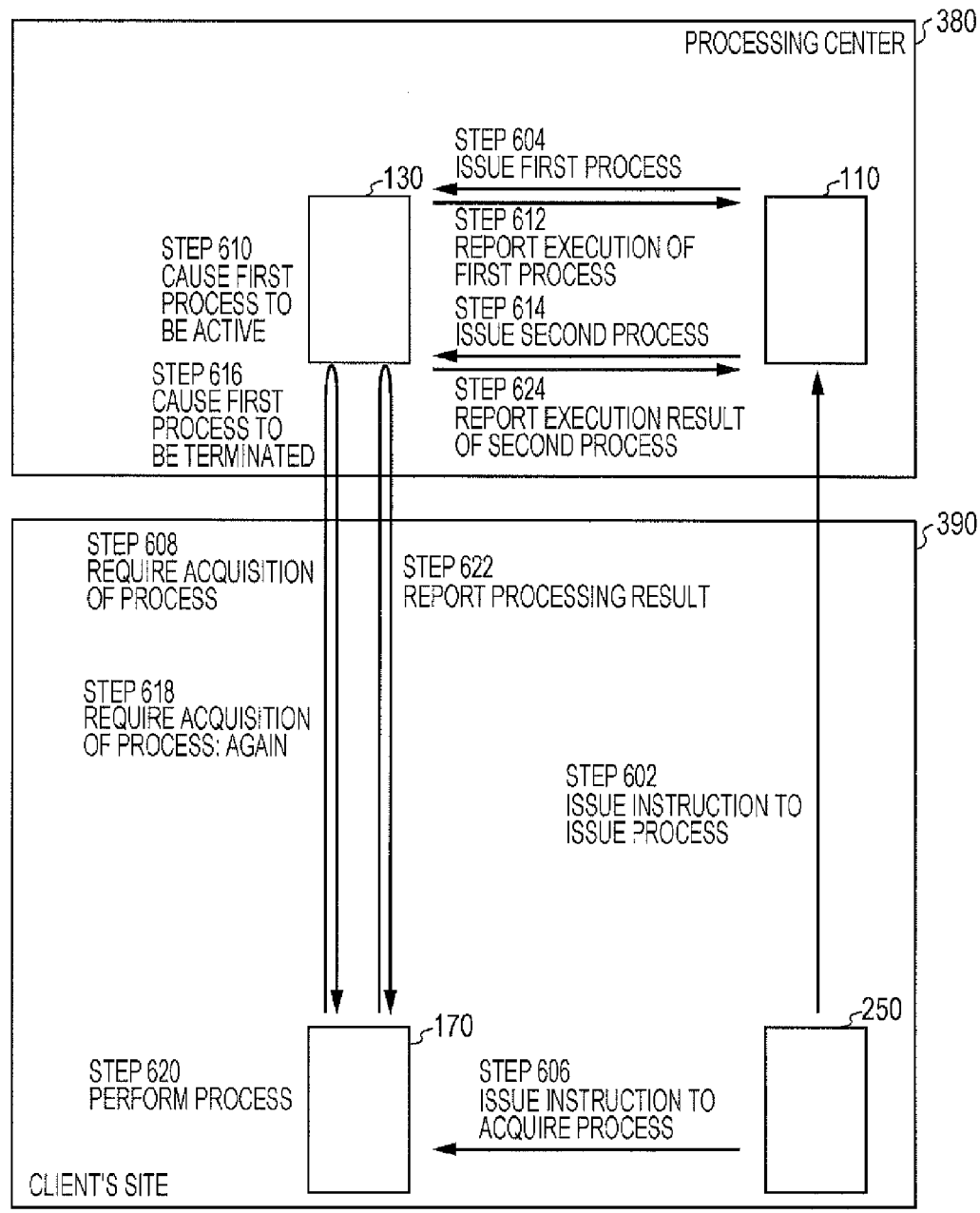
FIG. 6 is an explanatory diagram illustrating a processing example in an exemplary embodiment of the invention.

FIG. 6 is an explanatory diagram illustrating a processing example in an exemplary embodiment of the invention. In this example, in accordance with an instructing operation by a user, the instruction processing apparatus 250 issues an instruction regarding a management setting process executable period of time. The application processing apparatus 110 and the information processing apparatus 130 are arranged in the processing center 380 and the apparatus 170 and the instruction processing apparatus 250 are arranged in the client's side 390. That is, as illustrated in the example of FIG. 2, the apparatus 170 and the instruction processing apparatus 250 are arranged inside a firewall, and the application processing apparatus 110 and the information processing apparatus 130 are arranged outside the firewall.

In step 602, for example, the instruction processing apparatus 250 instructs, using a Web browser or the like, the application processing apparatus 110 to issue a process. That is, the application processing apparatus 110 receives from the instruction processing apparatus 250 an instruction to issue a process to be performed by the apparatus 170.

Step 604 corresponds to step 302 described above. However, the management setting process executable period of time transmitted to the information processing apparatus 130 includes the time at which the instruction was received from the instruction processing apparatus 250 in step 602. That is, a process is immediately performed. Furthermore, the term of validity of a first process is set to be shorter than a predetermined period of time. That is, since the apparatus 170 transmits, through a polling communication or the like, a process acquisition request in accordance with the next processing of step 606, the time during which the first process is stored in the information processing apparatus 130 is set to be short.

In step 606, the instruction processing apparatus 250 instructs the apparatus 170 to acquire a process. More specifically, an instruction to cause the apparatus 170 to send a polling communication or the like, which serves as a process acquisition request to the information processing apparatus 130, is issued from the instruction processing apparatus 250 to the apparatus 170.

In step 608, the apparatus 170 transmits, through a polling communication or the like, a process acquisition request to the information processing apparatus 130. That is, in the case where the apparatus 170 receives an instruction to acquire a process from the instruction processing apparatus 250 in step 606, the apparatus 170 transmits a process acquisition request to the information processing apparatus 130.

The processing of steps 610 to 624 corresponds to the processing of steps 306 to 320.

Figure 7:
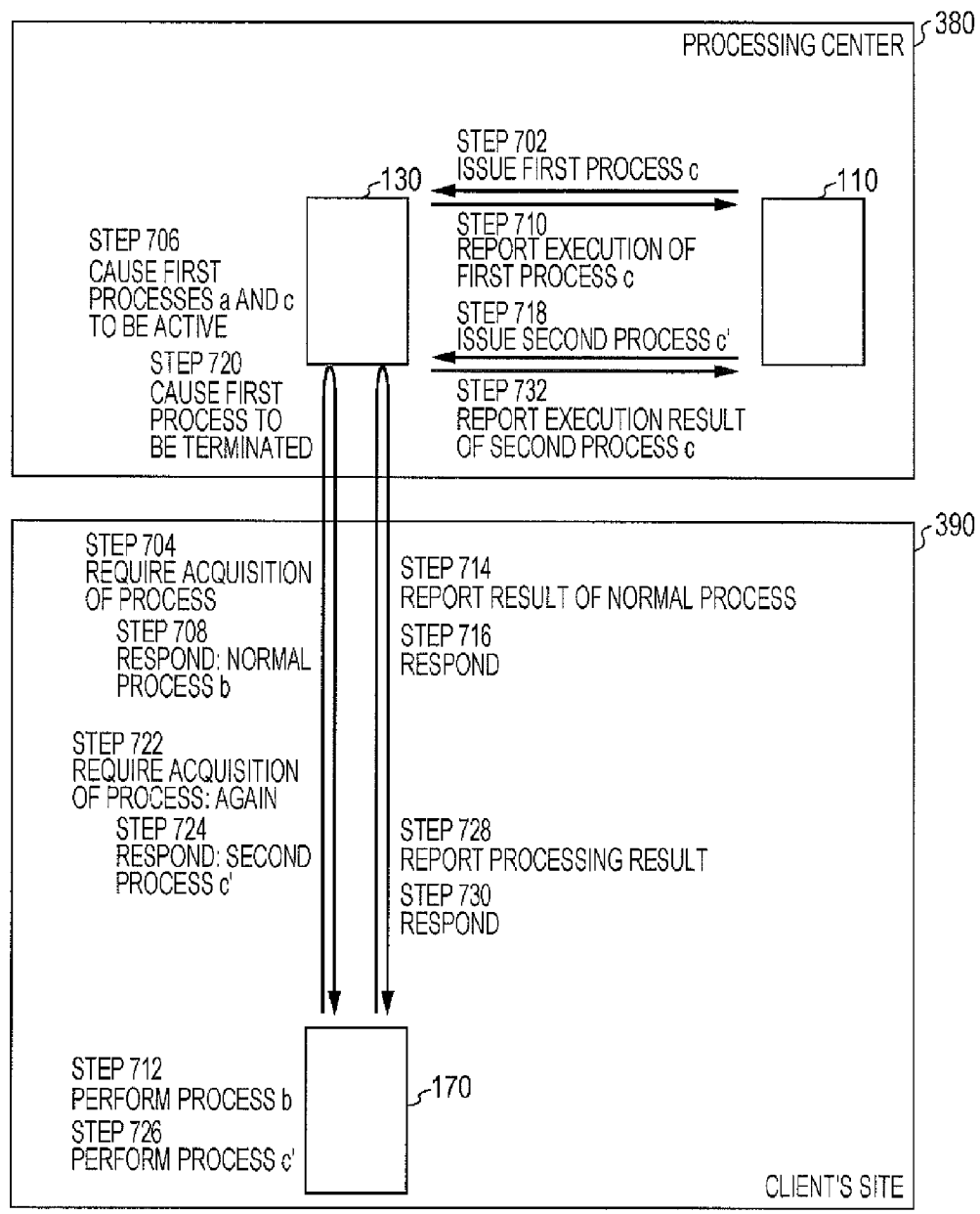
FIG. 7 is an explanatory diagram illustrating a processing example in an exemplary embodiment of the invention.

FIG. 7 is an explanatory diagram illustrating a processing example in an exemplary embodiment of the invention. The case where a different process (normal process) exists in a processing queue is illustrated in FIG. 7.

Before explaining the processing example in FIG. 7, an example of a process for transmitting a different process (normal process) from the application processing apparatus 110 via the information processing apparatus 130 to the apparatus 170 will be explained with reference to FIG. 11.

Figure 11:
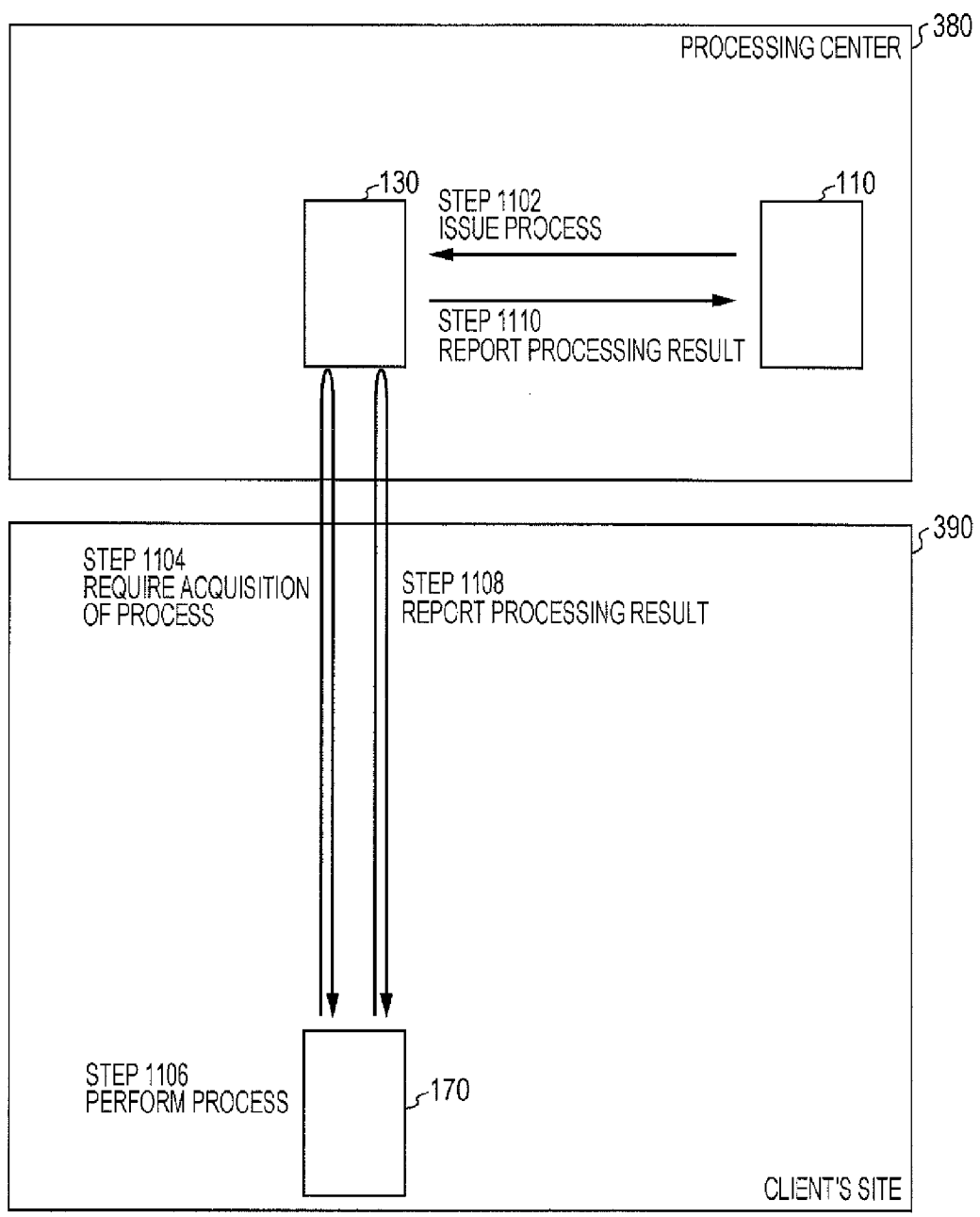
FIG. 11 is an explanatory diagram illustrating a processing example in an exemplary embodiment of the invention.

FIG. 11 is an explanatory diagram illustrating a processing example in an exemplary embodiment of the invention.

In step 1102, the application processing apparatus 110 issues a process (normal process) to the information processing apparatus 130.

In step 1104, the apparatus 170 transmits a process acquisition request to the information processing apparatus 130.

In step 1106, the apparatus 170 performs a process (normal process).

In step 1108, the apparatus 170 notifies the information processing apparatus 130 of a processing result.

In step 1110, the information processing apparatus 130 notifies the application processing apparatus 110 of a job result.

Furthermore, the processes regarding the "management setting process executable period of time" and the "set polling time" illustrated in FIG. 3 may be combined with the processes illustrated in FIG. 11. That is, in steps 1102 and 1106, the processes regarding the "management setting process executable period of time" and the "set polling time" equivalent to the processing of steps 302 and 306 may be performed.

In the processing example illustrated in FIG. 11, the two-stage processes described above are not performed. A process (normal process) generated by the application processing apparatus 110 is stored in the information processing apparatus 130 and the process (normal process) is transmitted to the apparatus 170 upon receiving a communication from the apparatus 170.

Since the apparatus 170 is not capable of detecting the time when a process is issued, it may take a long time from step 1102 to step 1104. For example, in the case where the apparatus 170 performs processing of step 1104 once a day, if the processing of step 1104 is performed immediately before the processing of step 1102, it takes one day from step 1102 to step 1104. For example, due to a breakdown, power-off, a network failure, or the like of the apparatus 170, it may take more than one day from step 1102 to step 1104.

In step 1108, the information processing apparatus 130 is capable of setting NextHint for the apparatus 170. That is, in the case where the information processing apparatus 130 requires the apparatus 170 to perform step 1104 again (for example, in the case where since plural normal processes exist in a processing queue of the information processing apparatus 130, all the normal processes are not transmitted to the apparatus 170 only by a single operation of the processing of step 1104), the information processing apparatus 130 designates a value equal to or greater than 0. Here, "0" represents that a process is performed immediately, and a value greater than "0" represents that a process is performed after a specified time has passed. If NextHint is not designated, the apparatus 170 does not perform further processing of step 1104 (for example, processing of step 1104 is not performed until the fixed time on the next day).

The processing example illustrated in FIG. 7 is a combination of the processing example illustrated in FIG. 3 and the processing example illustrated in FIG. 11.

The processing example illustrated in FIG. 7 illustrates the case where a different process also exists in a processing queue at the time of step 304 in the processing example illustrated in FIG. 3.

(1) Basically, processes are transmitted to the apparatus 170 in order from the leading process (that is, in the registered order). However, since a first process is not transmitted to the apparatus 170 and a second process does not exist at this time, if a different process exits in a processing queue, the different process is transmitted to the apparatus 170. In this case, since the apparatus 170 sends a notification of a processing result, NextHint is not designated at this timing (step 608).

In the case where the next process is a first process again, the process is also made to enter an active state. If a further next process exists, the next process is transmitted to the apparatus 170 (the same applies to the below).

In the case where a different process does not exist in a processing queue, NextHint is designated (on the basis of polling interval information described in the first process), and information indicating that no process to be delivered to the apparatus 170 exists is transmitted.

(2) In the Case where Plural Active First Processes Exist

The shortest standby time (polling interval) among standby times for the active first processes is used as the value of NextHint.

Figure 8:
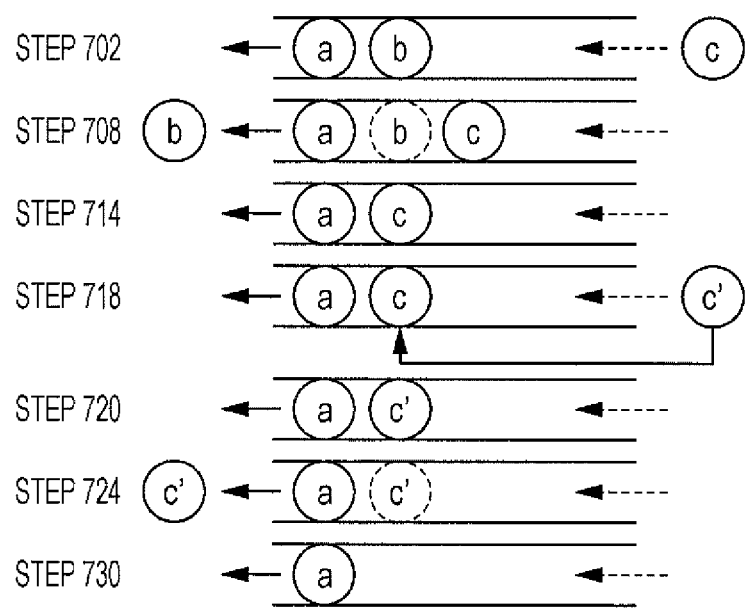
FIG. 8 is an explanatory diagram illustrating an example of a processing queue in a processing example in an exemplary embodiment of the invention.

Here, it is assumed that as an initial state, a first process a (NextHint (standby time variable) is y) and a normal process b have been issued from a different application processing apparatus 110 (that is, a state in which the normal process b is stored in the information processing apparatus 130 but has not been processed (that is, the normal process b is not transmitted to the apparatus 170)) (see step 702 illustrated in FIG. 8).

In step 702, the application processing apparatus 110 issues a first process c to the information processing apparatus 130 (see step 702 illustrated in FIG. 8). Here, NextHint (standby time variable) is set to x.

In step 704, the apparatus 170 transmits a process acquisition request to the information processing apparatus 130.

In step 706, the information processing apparatus 130 causes the first processes a and c to be active.

In step 708, the information processing apparatus 130 sends the normal process b, as a response, to the apparatus 170. That is, the information processing apparatus 130 transmits the normal process b to the apparatus 170 (see step 708 illustrated in FIG. 8).

In step 710, the information processing apparatus 130 notifies the application processing apparatus 110 of the execution of the first process c. The information processing apparatus 130 also notifies the application processing apparatus 110, which has issued the first process a, of the execution of the first process a.

In step 712, the apparatus 170 performs the process b.

In step 714, the apparatus 170 notifies the information processing apparatus 130 of the processing result of the normal process b (see step 714 illustrated in FIG. 8).

In step 716, the information processing apparatus 130 responds to the apparatus 170. The response includes information indicating that NextHint (standby time variable) is set to min(x,y) (a function for extracting a smaller value of x and y).

In step 718, the application processing apparatus 110 issues a second process c' to the information processing apparatus 130 (although a second process c is represented as a second process c' so as to be distinguished from the first process c in FIG. 8, the second process c' is equivalent to the second process c) (see step 718 illustrated in FIG. 8). The second process c' corresponds to the first process c.

In step 720, the information processing apparatus 130 causes the first process c to be terminated (see step 720 illustrated in FIG. 8).

In step 722, the apparatus 170 transmits a process acquisition request to the information processing apparatus 130 again.

In step 724, the information processing apparatus 130 responds to the apparatus 170 (see step 724 illustrated in FIG. 8). That is, the information processing apparatus 130 transmits the second process c' to the apparatus 170.

In step 726, the apparatus 170 performs the second process c' (equivalent to the second process c).

In step 728, the apparatus 170 notifies the information processing apparatus 130 of the processing result of the second process c'.

In step 730, the information processing apparatus 130 responds to the apparatus 170 (see step 730 illustrated in FIG. 8). The response includes information indicating that NextHint (standby time variable) is set to y.

In step 732, the information processing apparatus 130 notifies the application processing apparatus 110 of the execution result of the second process c.

The processes regarding the "management setting process executable period of time" and the "set polling time" illustrated in FIG. 3 may be combined with the processes illustrated in FIG. 7. That is, in steps 702 and 706, the processes regarding the "management setting process executable period of time" and the "set polling time" equivalent to steps 302 and 306 may be performed.

Figure 9:
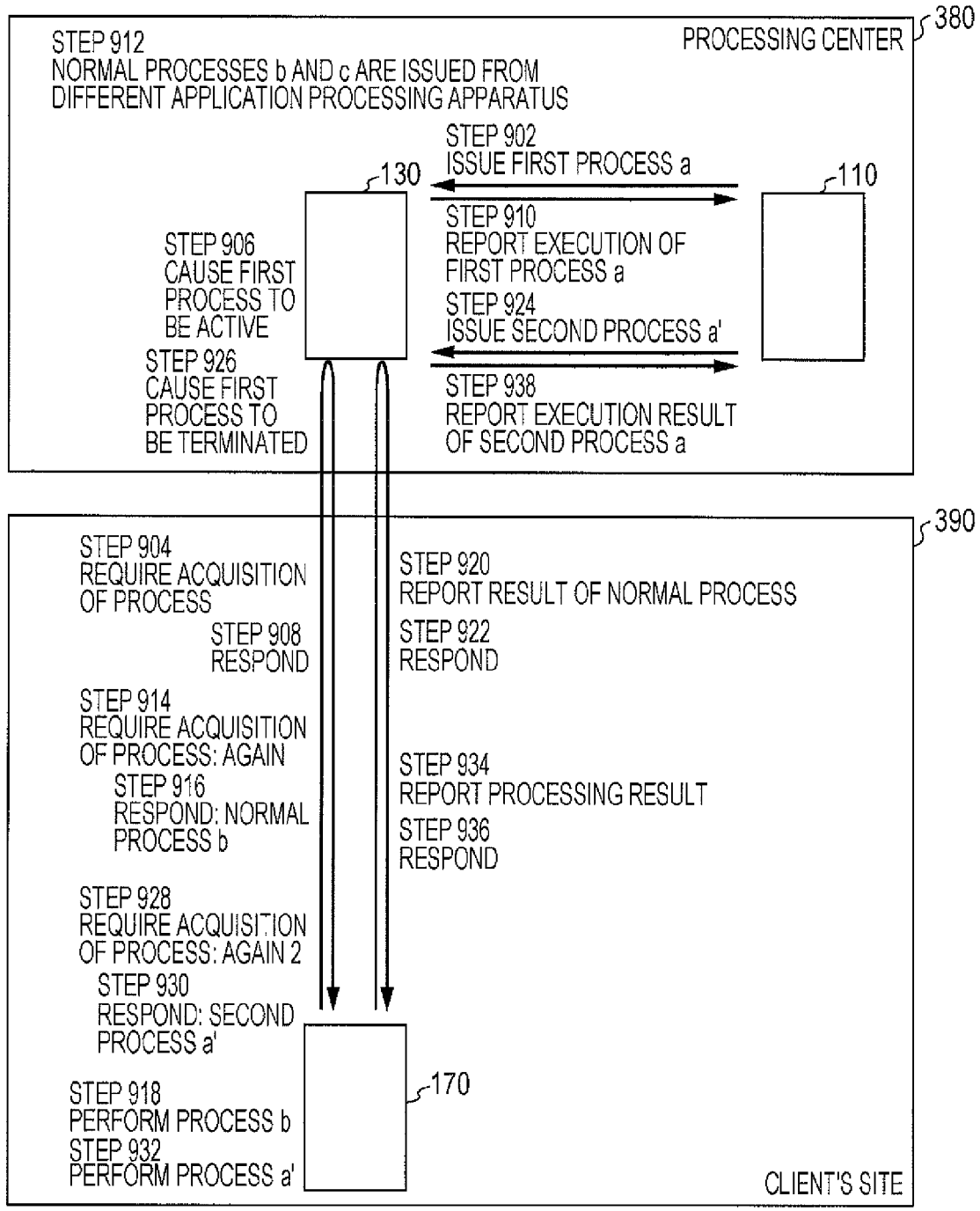
FIG. 9 is an explanatory diagram illustrating a processing example in an exemplary embodiment of the invention.

FIG. 9 is an explanatory diagram illustrating an example of processing performed in an exemplary embodiment. The processing example illustrated in FIG. 9 is a combination of the processing example illustrated in FIG. 3 and the processing example illustrated in FIG. 11. In particular, the case where the apparatus 170 transmits an acquisition request again during the execution of the first process is illustrated in FIG. 9.

(3) The case where a process acquisition request is transmitted from the apparatus 170 again during the execution of a first process will be explained. Similar to (1) in the explanation of the processing example illustrated in FIG. 7, if a different normal process exists in a processing queue, the different normal process is transmitted to the apparatus 170. If only an active first process exists in a processing queue, NextHint is designated (on the basis of polling interval information described in the first process), and information indicating that no process exists is transmitted to the apparatus 170. If a different first process exists in a processing queue, the different first process is caused to be active. If the further next process is a normal process, the normal process is transmitted to the apparatus 170 (the same applies to the below).

In step 902, the application processing apparatus 110 issues a first process a to the information processing apparatus 130. Here, NextHint (standby time variable) is set to x (see step 902 illustrated in FIG. 10)

In step 904, the apparatus 170 transmits a process acquisition request to the information processing apparatus 130.

In step 906, the information processing apparatus 130 causes the first process a to be active.

In step 908, the information processing apparatus 130 responds to the apparatus 170. Here, the response includes information indicating that NextHint is set to x.

In step 910, the information processing apparatus 130 notifies the application processing apparatus 110 of the execution of the first process a.

Figure 10:
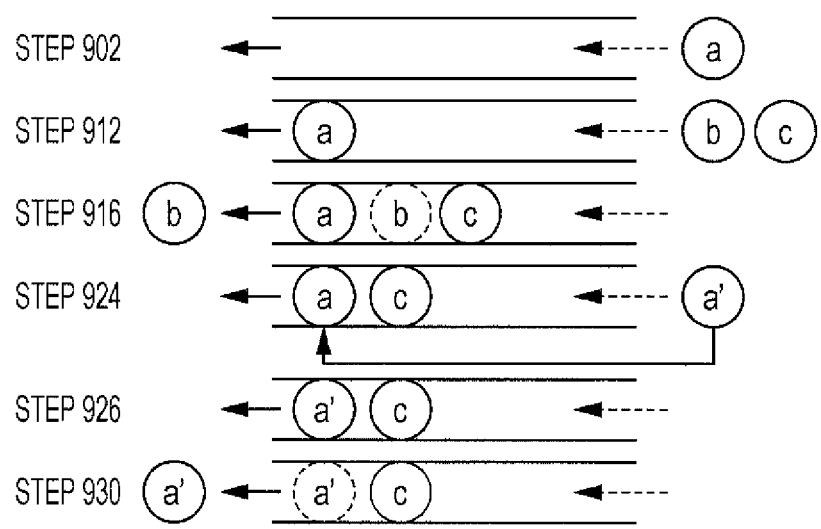
FIG. 10 is an explanatory diagram illustrating an example of a processing queue in a processing example in an exemplary embodiment of the invention.

In step 912, normal processes b and c are issued from a different application processing apparatus 110 (see step 912 illustrated in FIG. 10).

In step 914, the apparatus 170 transmits a process acquisition request to the information processing apparatus 130 again.

In step 916, the information processing apparatus 130 sends the normal process b, as a response, to the apparatus 170. That is, the information processing apparatus 130 transmits the normal process b, which exists in a processing queue, to the apparatus 170 (see step 916 illustrated in FIG. 10).

In step 918, the apparatus 170 performs the process b.

In step 920, the apparatus 170 notifies the information processing apparatus 130 of the processing result of the normal process b.

In step 922, the information processing apparatus 130 responds to the apparatus 170. Here, the response includes information indicating that NextHint is set to 0.

In step 924, the application processing apparatus 110 issues a second process a' to the information processing apparatus 130 (see step 924 illustrated in FIG. 10).

In step 926, the information processing apparatus 130 causes the first process a to be terminated (see step 926 illustrated in FIG. 10).

In step 928, the apparatus 170 transmits a process acquisition request to the information processing apparatus 130 again.

In step 930, the information processing apparatus 130 sends the second process a', as a response, to the apparatus 170. That is, the information processing apparatus 130 transmits the second process a', which exists in a processing queue, to the apparatus 170 (see step 930 illustrated in FIG. 10).

In step 932, the apparatus 170 performs the second process a' (second process a).

In step 934, the apparatus 170 notifies the information processing apparatus 130 of the processing result.

In step 936, the information processing apparatus 130 responds to the apparatus 170. Here, the response includes information indicating that NextHint is set to 0.

In step 938, the information processing apparatus 130 notifies the application processing apparatus 110 of the execution result of the second process a.

Furthermore, the processes regarding the "management setting process executable period of time" and the "set polling time" illustrated in the example of FIG. 3 may be combined with the processes illustrated in FIG. 9. That is, in steps 902 and 906, the processes regarding the "management setting process executable period of time" and the "set polling time" equivalent to steps 302 and 306 may be performed.

Here, in the case where it does not take time to generate processes by the application processing apparatus 110, after the processing of step 902, the information processing apparatus 130 may cause the apparatus 170 to wait without responding (step 908) to the apparatus 170 (that is, the apparatus 170 is caused to wait until the application processing apparatus 110 has generated a second process), may send a notification in step 910, and may send the second process, as a response (step 908), to the processing of step 904.

However, since the number of requests from the apparatus 170 that are capable being processed at the same time is limited, waiting for a long time deteriorates the processing ability of the information processing apparatus 130. Thus, the standby time is to be shortened.

Information as to whether or not standby time is provided (whether or not a job generation time is short) is described in a first process when the application processing apparatus 110 generates the first process. Alternatively, in the case where the value of polling interval information designated in the first process issued by the application processing apparatus 110 is sufficiently small (shorter than or equal to a predetermined period of time), the information processing apparatus 130 may cause the apparatus 170 to wait without causing the standby time instruction module 154 to issue an instruction.

Figure 12:
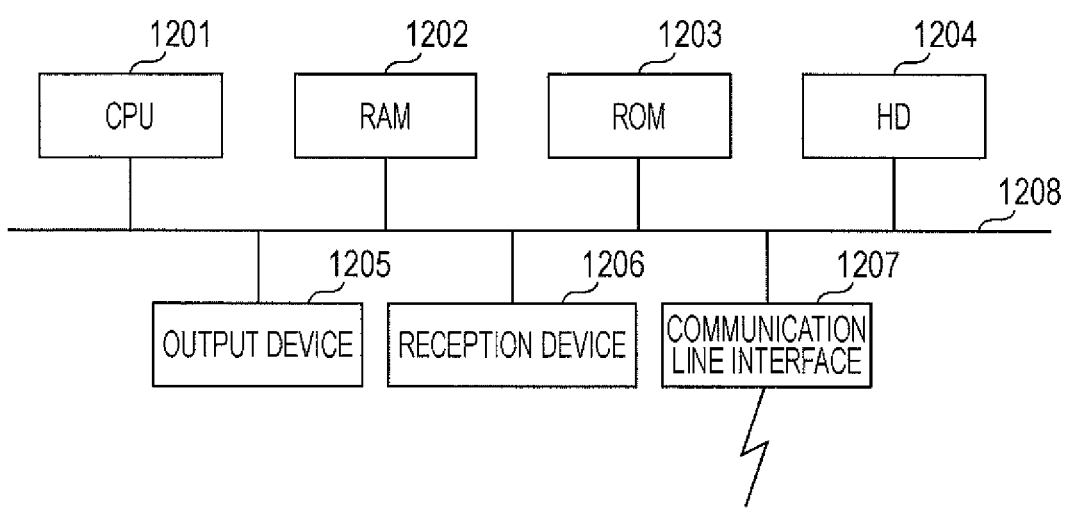
FIG. 12 is a block diagram illustrating an example of the hardware configuration of a computer that implements an exemplary embodiment of the invention (an application processing apparatus and an information processing apparatus)

As illustrated in FIG. 12, the hardware configuration of a computer as the application processing apparatus 110 and the information processing apparatus 130 according to an exemplary embodiment that executes a program is that of a general computer, more particularly, a computer that is capable of functioning as a personal computer, a server, or the like. That is, for example, a CPU 1201 is used as a processing unit (arithmetic unit), and a random access memory (RAM) 1202, a read only memory (ROM) 1203, and an HD 1204 are used as storing devices. The HD 1204 may be, for example, a hard disk. The computer includes the CPU 1201 that executes programs such as the process reservation module 112, the process generation module 114, the communication module 116, the communication X module 132, the first process reception module 134, the first process registration module 136, the communication Y module 140, the polling reception module 142, the first process extraction module 144, the second process request module 146, the second process reception module 148, the second process output module 152, the standby time instruction module 154, the management setting process executable period of time determination module 160, and the like, the RAM 1202 that stores therein the programs and data, the ROM 1203 that stores therein a program for activating the computer, the HD 1204 serving as an auxiliary storing device, a receiving device 1206 that receives data on the basis of a user operation for a keyboard, a mouse, a touch panel, and the like, an output device 1205 such as a cathode ray tube (CRT), a liquid crystal display, or the like, a communication line interface 1207 that allows connection with a communication network such as a network interface card, and a bus 1208 that allows connection between the elements for data exchange. Plural such computers may be connected via a network.

Among the exemplary embodiments described above, an exemplary embodiment concerning a computer program is implemented by reading the computer program serving as software to a system having the hardware configuration described above and making the software cooperate with hardware resources.

The hardware configuration illustrated in FIG. 12 is merely an example and is not necessarily provided. Any configuration may be provided as long as the modules explained in the exemplary embodiments are capable of being implemented. For example, some modules may be configured using dedicated hardware (for example, an application specific integrated circuit (ASIC)). Some modules may be arranged in an external system and may be connected via a communication line. In addition, the systems illustrated in FIG. 12 may be connected via communication lines so that cooperative operations may be performed.

Figure 13:
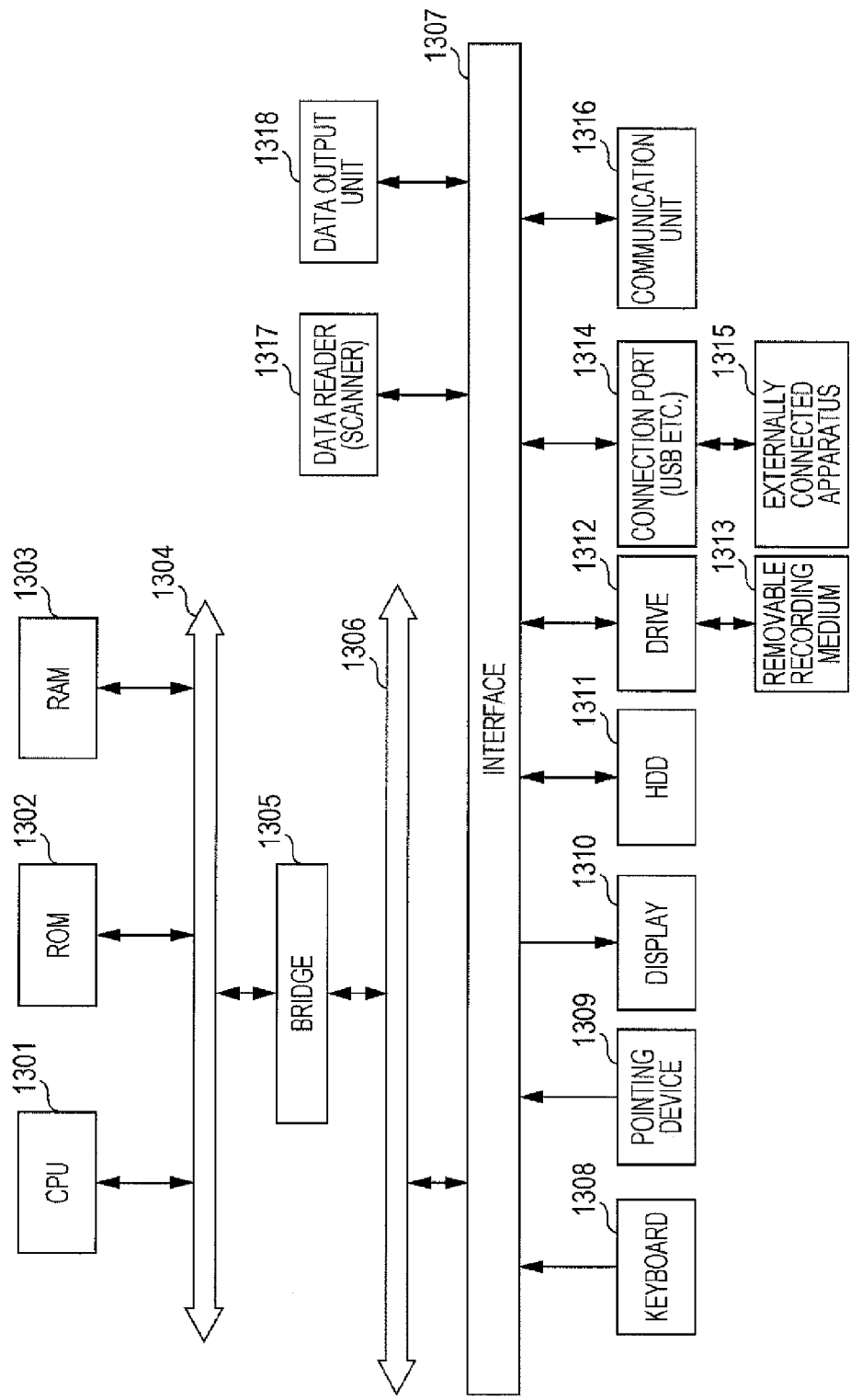
FIG. 13 is a block diagram illustrating an example of the hardware configuration of a computer that implements an exemplary embodiment of the invention (an apparatus).

The hardware configuration of the apparatus 170 according to an embodiment of the invention, which is, for example, an image processing apparatus, will be explained with reference to FIG. 13. The configuration illustrated in FIG. 13 includes, for example, a personal computer (PC) or the like. An example of the hardware configuration including a data reader 1317, which is a scanner or the like, and a data output unit 1318, which is a printer or the like, is illustrated in FIG. 13.

A CPU 1301 is a control unit that performs processing in accordance with a computer program in which execution sequences of various modules explained in the foregoing embodiments, such as the communication module 172, the polling processing module 174, the processing module 176, and the like.

A ROM 1302 stores programs, arithmetic parameters, and the like used by the CPU 1301. A RAM 1303 stores therein programs used by the CPU 1301, parameters that appropriately change by the execution of the programs, and the like. The CPU 1301, the ROM 1302, and the RAM 1303 are connected to one another through a host bus 1304 including a CPU bus or the like.

The host bus 1304 is connected through a bridge 1305 to an external bus 1306, such as a peripheral component interconnect/interface) bus.

A keyboard 1308, a pointing device 1309 such as a mouse are input devices operated by an operator. A display 1310 is a liquid crystal display device or a CRT. The display 1310 displays various types of information as text and image information.

An HDD 1311 includes a hard disk, drives the hard disk, ad records or plays a program or information to be executed by the CPU 1301. A second process and the like are stored in the hard disk. Various data processing programs, various computer programs, and the like are also stored in the hard disk.

A drive 1312 reads data or a program recorded in a removable recording medium 1313, such as an inserted magnetic disk, optical disk, magneto-optical disk, semiconductor memory, or the like, and supplies the data or the program to the RAM 1303, which is connected to the drive 1312 via an interface 1307, the external bus 1306, the bridge 1305, and the host bus 1304. A removable recording medium 131 is also usable as a data recording region similar to a hard disk.

A connection port 1314 is a port connecting to an externally connected device 1315 and includes a connecting part for a universal serial bus (USB), IEEE 1394, or the like. The connection port 1314 is connected to the CPU 1301 and the like via the interface 1307, the external bus 1306, the bridge 1305, the host bus 1304, and the like. A communication unit 1316 is connected to a communication line and performs data communication processing for an external device. The data reader 1317 is, for example, a scanner, and performs processing for reading documents. The data output unit 1318 is, for example, a printer, and performs processing for outputting document data.

The hardware configuration illustrated in FIG. 13 is merely an example and is not necessarily provided. Any configuration may be provided as long as the modules explained in the exemplary embodiments are capable of being implemented. For example, some modules may be configured using dedicated hardware (for example, an ASIC). Some modules may be arranged in an external system and may be connected via a communication line. In addition, the systems illustrated in FIG. 13 may be connected via communication lines so that cooperative operations may be performed.

The process illustrated in the example of FIG. 6 and the process illustrated in the example of FIG. 7 or FIG. 9 may be combined together. That is, the instruction processing apparatus 250 may be added to the example illustrated in FIG. 7 or FIG. 9. Before the processing of step 702 or step 902, processing equivalent to the processing of step 602 may be added. After the processing of step 702 or step 902, processing equivalent to the processing of step 606 may be added. In step 704 or 904, the apparatus 170 may transmit, through a polling communication or the like, a process acquisition request to the information processing apparatus 130, in accordance with an instruction from the instruction processing apparatus 250. The program described above may be stored in a recording medium to be supplied or may be supplied by a communication unit. In such a case, for example, the program described above may be regarded as being an invention relating to "a computer readable recording medium in which a program is recorded".

The "computer readable recording medium in which a program is recorded" is a computer readable recording medium in which a program is recorded, where the recording medium is used for installing the program, executing the program, circulating the program, or the like.

The recording medium is, for example, a digital versatile disc-recordable (DVD-R), a DVD-rewritable (DVD-RW), a DVD-RAM, or the like, which is developed by a DVD forum, a DVD+R, a DVD+RW, or the like, which is developed by DVD+RW, a compact disc read-only memory (CD-ROM), a CD-recordable (CD-R), a CD rewritable (CD-RW), a Blu-ray disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, a random-access memory (RAM), a secure digital (SD) memory card, or the like.

The program described above or part of the program described above may be recorded in the recording medium to be stored or circulated. In addition, the program may be transmitted via, for example, a local area network (LAN), a metropolitan area network (MAN), a wide area network (WAN), a wired or wireless network used for the Internet, intranet, extranet, or a transmission medium using the combination of some of the above-mentioned networks, or may be carried on a carrier wave.

Furthermore, the program described above may be part of a different program or may be recorded together with a different program in a recording medium. The program may be divided and recorded in plural recording media. The program may be recorded in any form as long as restoration, such as compression or encryption, is capable of being performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first receiving unit that receives from a first information processing apparatus (1) a reservation and (2) setting process executable time information, the reservation being a reservation to transmit a management setting from the first information processing apparatus, the setting process executable time information representing a period of time during which a second information processing apparatus is able to process the management setting;
    a registering unit that registers in a storing unit the reservation and the information regarding the period of time received by the first receiving unit;
    a requiring unit that requires the first information processing apparatus to transmit the management setting, in a case where a time at which a communication from the second information processing apparatus was received corresponds to the information regarding the period of time registered in the storing unit;
    a second receiving unit that receives from the first information processing apparatus, in response to a request by the requiring unit, the management setting to be processed by the second information processing apparatus;
    a transmitting unit that transmits to the second information processing apparatus the management setting received by the second receiving unit; and
    an instructing unit,
    wherein the first receiving unit receives standby time during which the second information processing apparatus is in a standby state,
    wherein in a case where the reservation is stored in the storing unit when the communication from the second information processing apparatus is received, the instructing unit instructs the second information processing apparatus to send a communication to the information processing apparatus after the standby time received by the first receiving unit has passed, and
    wherein in a case where the communication from the second information processing apparatus is received after the standby time has passed, the transmitting unit transmits the management setting received by the second receiving unit to the second information processing apparatus.

2. The information processing apparatus according to claim 1,
    wherein the information processing apparatus and the first information processing apparatus are arranged outside a firewall including the second information processing apparatus,
    wherein the first information processing apparatus receives from a third information processing apparatus an instruction to issue the management setting to be processed by the second information processing apparatus, the third information processing apparatus being arranged in the firewall in which the second information processing apparatus is arranged, and transmits to the information processing apparatus, as the reservation, which is a reservation for transmission of the management setting, and the period of time, a period of time including time at which the instruction was received from the third information processing apparatus, and
    wherein the third information processing apparatus instructs the second information processing apparatus to send a communication to the information processing apparatus.

3. The information processing apparatus according to claim 2,
    wherein in a case where the time at which the communication from the second information processing apparatus was received is a specific period of time before the period of time, the requiring unit requires the first information processing apparatus to transmit the management setting corresponding to the period of time after the period of time has been reached.

4. The information processing apparatus according to claim 2,
    wherein in a case where the management setting to be transmitted to the second information processing apparatus exists when the communication from the second information processing apparatus is received, the transmitting unit transmits the management setting to the second information processing apparatus, and
    wherein in a case where the management setting to be transmitted to the second information processing apparatus has not been received when the communication from the second information processing apparatus is received, the transmitting unit transmits to the second information processing apparatus information indicating that the second information processing apparatus is to enter a standby state.

5. The information processing apparatus according to claim 1,
    wherein in a case where the time at which the communication from the second information processing apparatus was received is a specific period of time before the period of time, the requiring unit requires the first information processing apparatus to transmit the management setting corresponding to the period of time after the period of time has been reached.

6. The information processing apparatus according to claim 1, wherein in a case where the management setting to be transmitted to the second information processing apparatus exists when the communication from the second information processing apparatus is received, the transmitting unit transmits the management setting to the second information processing apparatus, and wherein in a case where the management setting to be transmitted to the second information processing apparatus has not been received when the communication from the second information processing apparatus is received, the transmitting unit transmits to the second information processing apparatus information indicating that the second information processing apparatus is to enter a standby state.

7. The information processing apparatus according to claim 6, wherein the first receiving unit receives the standby time during which the second information processing apparatus is in the standby state, and wherein in a case where the standby time received by the first receiving unit is shorter than or equal to a specific time, the transmitting unit waits until the second receiving unit has received the management setting without causing the instructing unit to issue an instruction, and transmits the process received by the second receiving unit to the second information processing apparatus.

8. The information processing apparatus according to claim 6, wherein the first receiving unit receives an instruction as to whether or not an instruction is to be issued by the instructing unit, and wherein in a case where the instruction received by the first receiving unit indicates that an instruction is not to be issued by the instructing unit, the transmitting unit waits until the second receiving unit has received the management setting without causing the instructing unit to issue an instruction, and transmits the management setting received by the second receiving unit to the second information processing apparatus.

9. The information processing apparatus according to claim 1, wherein the first receiving unit receives the standby time during which the second information processing apparatus is in the standby state, and wherein in a case where the standby time received by the first receiving unit is shorter than or equal to a specific time, the transmitting unit waits until the second receiving unit has received the management setting without causing the instructing unit to issue an instruction, and transmits the process received by the second receiving unit to the second information processing apparatus.

10. The information processing apparatus according to claim 1, wherein the first receiving unit receives an instruction as to whether or not an instruction is to be issued by the instructing unit, and wherein in a case where the instruction received by the first receiving unit indicates that an instruction is not to be issued by the instructing unit, the transmitting unit waits until the second receiving unit has received the management setting without causing the instructing unit to issue an instruction, and transmits the management setting received by the second receiving unit to the second information processing apparatus.

11. An information processing method comprising:

receiving from a first information processing apparatus (1) a reservation and (2) setting process executable time information, the reservation being a reservation to transmit a management setting from the first information processing apparatus, the setting process executable time information representing a period of time during which a second information processing apparatus is able to process the management setting;

registering the received reservation and information regarding the period of time;

requiring the first information processing apparatus to transmit the management setting, in a case where a time at which a communication from the second information processing apparatus was received corresponds to the registered information regarding the period of time;

receiving from the first information processing apparatus, in response to a request, the management setting to be processed by the second information processing apparatus;

transmitting the received management setting to the second information processing apparatus and instructing, wherein the receiving from the first information processing apparatus includes receiving a standby time during which the second information processing apparatus is in a standb state, wherein in a case where the reservation is stored in a storing unit when the communication from the second information processing apparatus is received, the instructing includes instructing the second information processing apparatus to send a communication to an information processing apparatus performing the information processing method after the standby time has passed, and wherein in a case where the communication from the second information processing apparatus is received after the standby time has passed, transmitting the management setting received by the second receiving unit to the second information processing apparatus.

12. A non-transitory computer readable medium storing a program causing a computer to execute a process for image processing, the process comprising:

receiving from a first information processing apparatus (1) a reservation and (2) setting process executable time information, the reservation being a reservation to transmit a management setting from the first information processing apparatus, the setting process executable time information representing a period of time during which a second information processing apparatus is able to process the management setting;

registering the received reservation and information regarding the period of time;

requiring the first information processing apparatus to transmit the management setting, in a case where a time at which a communication from the second information processing apparatus was received corresponds to the registered information regarding the period of time;

receiving from the first information processing apparatus, in response to a request, the management setting to be processed by the second information processing apparatus;

transmitting the received management setting to the second information processing apparatus; and instructing, wherein the receiving from the first information processing apparatus includes receiving a standby time during which the second information processing apparatus is in a standby state, wherein in a case where the reservation is stored in a storing unit when the communication from the second information processing apparatus is received, the instructing includes instructing the second information processing apparatus to send a communication to an information processing apparatus performing the information processing method after the standby time has passed, and wherein in a case where the communication from the second information processing apparatus is received after the standby time has passed, transmitting the management setting received by the second receiving unit to the second information processing apparatus.

* * * * *